United States Patent
Safa

(10) Patent No.: US 7,119,954 B2
(45) Date of Patent: Oct. 10, 2006

(54) OPTICAL INSTRUMENT FOR OBSERVATION FROM A SATELLITE, WITH TWO TELESCOPES

(75) Inventor: Frédéric Safa, Toulouse (FR)

(73) Assignee: Eads Astrium SAS, Velizy-Villacoublay (FR)

( * ) Notice: Subject to any disclaimer, the term of this patent is extended or adjusted under 35 U.S.C. 154(b) by 0 days.

(21) Appl. No.: 10/887,666

(22) Filed: Jul. 9, 2004

(65) Prior Publication Data

US 2005/0036198 A1    Feb. 17, 2005

(30) Foreign Application Priority Data

Feb. 7, 2002    (FR)    ................... 02 01534

(51) Int. Cl.
*G02B 23/00*    (2006.01)
(52) U.S. Cl. ........................ 359/399; 359/419
(58) Field of Classification Search ............... 359/399, 359/407, 419
See application file for complete search history.

(56) References Cited

U.S. PATENT DOCUMENTS

| | | | |
|---|---|---|---|
| 3,402,977 A | 9/1968 | La Russa et al. ........... 359/407 |
| 4,682,029 A * | 7/1987 | Diepeveen et al. ......... 250/330 |
| 4,856,884 A * | 8/1989 | Fender et al. ................ 359/419 |
| 4,911,530 A * | 3/1990 | Lo ................................ 359/464 |
| 4,953,964 A * | 9/1990 | Anafi et al. .................. 359/419 |
| 5,012,081 A * | 4/1991 | Jungwirth et al. ........ 250/203.6 |
| 5,208,654 A | 5/1993 | Shao et al. ................... 356/498 |
| 5,485,306 A | 1/1996 | Kiunke et al. ............... 359/419 |
| 5,867,318 A * | 2/1999 | Cordier et al. .............. 359/618 |
| 5,886,816 A * | 3/1999 | Faris ........................... 359/464 |
| 5,905,591 A | 5/1999 | Duncan et al. .............. 359/399 |
| 6,075,644 A | 6/2000 | Filipovich et al. .......... 359/407 |
| 6,185,037 B1 | 2/2001 | Lutz et al. ................... 359/399 |
| 6,201,641 B1 | 3/2001 | Filipovich et al. .......... 359/419 |
| 2001/0015847 A1* | 8/2001 | Sugawara .................... 359/462 |
| 2004/0207916 A1* | 10/2004 | Singer ......................... 359/399 |

FOREIGN PATENT DOCUMENTS

WO    WO 98 28641 A    7/1998

* cited by examiner

*Primary Examiner*—Mark A. Robinson
*Assistant Examiner*—Mark Consilvio
(74) *Attorney, Agent, or Firm*—Sturm & Fix LLP

(57) ABSTRACT

The invention concerns an optical instrument, designed to be used on a satellite, for simultaneously or quasi-simultaneously observing in two opposite angularly separated directions. It comprises at least two telescopes (TA, TB) having angularly spaced apart observation directions, each having a real and accessible exit pupil and respective planar or superimposable image fields, with a width at least five times more than that of the pupil in a specific direction. Optical means provided at the exit pupil are arranged so as to form the image fields in a common overlapping focal plane except in lateral zones whereof the width is substantially equal to that of the exit pupil of the telescopes. In the common focal plane, an assembly of several matrix detectors are arranged and oriented on the superimposition zone of the image fields of the telescopes in the wavefront.

13 Claims, 3 Drawing Sheets

OPTICAL INSTRUMENT FOR OBSERVATION FROM A SATELLITE, WITH TWO TELESCOPES

The present invention relates to optical instruments designed to be used on satellites and allowing observations to be made simultaneously, or virtually simultaneously, in two directions that are angularly separated, typically by several tens of degrees. The following are examples of such applications:

stereo-mode observations of the Earth from low-orbit satellites. In this case, the instrument must acquire two images of the same scene from two sighting directions typically separated by 30 to 45 degrees. The stereo acquisition of the image allows the ground altitude profile and the three-dimensional image of the Earth to be restored.

various scientific observations that require the sky to be swept while simultaneously observing in two different directions; astrometric satellites comprising a stellar sensor based on this principle are already in existence.

In order to satisfy these requirements, the instrument must comprise two measurement channels operating simultaneously, or virtually simultaneously. In order to reduce the system cost and complexity it is generally arranged that a same telescope is common to the two measurement channels with a double focal plane or the focal plane is made to be common to two telescopes.

Such observation instruments are high resolution which requires a large diameter telescope for space applications (greater than 1 meter) and a large and complex focal plane, comprising several tens or hundreds of matrix detectors and high-speed video processors. It can often turn out that there is a number of juxtaposed detectors such that the total number of photosensitive sites exceeds 50 000×50 000.

The design of satellites in the field of space applications has the ever-present concerns of minimizing the mass, the power consumption and the dimensions of the satellite. The total cost of the satellite and its feasibility are directly dependent on these three parameters. Today, the detection subassembly constitutes the preponderant element of the instrument from the point of view of cost, complexity, mass, power, development schedule and testing.

Instruments allowing observations to be made in two different directions with a same focal plane are already known. Two designs are used. One of them comprises two telescopes and a semitransparent plate that allows the image planes to be superimposed at the exit. This results in a loss of 50% of the flux. The other comprises a single telescope. Two entry mirrors placed in front of the telescope and angularly separated share the entry pupil. This results in a loss of 50% of the flux that would be collected with two separate telescopes. The second design has the advantage of also having a common telescope, but the constraints of mass, size and stability on the beam combiner make the design very difficult to implement for large diameters. In addition, this design leads to a degradation in the resolution of a factor of 2 in the direction of separation.

The aim of the invention is notably to provide an instrument that allows two or more measurement channels to be obtained with separate telescopes and a common focal plane while totally respecting the coplanarity of the wavefronts of the two telescopes with the common focal plane without flux loss and with a reduced loss of angular field.

For this purpose, the subject of the invention is, notably, an optical instrument designed to be used on a satellite and allowing simultaneous or virtually simultaneous observations to be made in two angularly separated directions, comprising:

at least two telescopes having angularly separated observation directions, each having an exit pupil or a real and accessible intermediate pupil and respective plane or superimposable image fields, of width at least 3 times larger, or advantageously at least 5 times larger, than that of the pupil in a given direction; optical means placed at the exit or intermediate pupil and disposed so as to form the image fields overlapping in a common focal plane except in lateral regions whose width is substantially that of the exit pupil of the telescopes; and in the common focal plane, an assembly of two or more matrix detectors, disposed and oriented on the superimposed region of the image fields of the telescopes in the wavefront.

It can be seen that the invention uses the fact that the dimensions of the exit pupil may be greatly reduced, often below one tenth in the direction of the shift, compared to those of the focal plane image. In addition, in some cases advantage may be taken of the shift for identification purposes, in particular in the case where the object space is continuously displaced in the direction of the shift.

The optical means will generally consist of two mirrors, situated on, or in the neighborhood of, the exit pupils of the two telescopes, oriented in order to effectively superimpose the two image fields by forming superimposed wavefronts.

Often the instrument will comprise two sets of plane folding mirrors, not necessarily identical, situated between the exit of the telescopes and their respective exit pupils, having the function of facilitating the installation of the telescopes on the structure of the instrument, having especially the function of bringing the exit pupils of the two telescopes sufficiently close together while still keeping them separate.

In general the focal length of the telescopes greatly exceeds 10 meters. In typical cases for stellar observations, it can exceed 40 meters. An additional set of folding mirrors, which may be common to both telescopes, is advantageously disposed between the exit pupils and the superimposed image fields in order to facilitate the mechanical layout of the instrument.

The telescopes may consist of mirrors, lenses or a combination of both, each optimized over a sufficiently large extended field, observing in two directions with any given orientation possibly adjustable by a suitable mechanical installation of the optical elements on the structure of the instrument, and designed such that the exit pupils can be brought close to each other when the image fields are effectively superimposed.

Optical filters, notably color filters, can be disposed in the separate optical paths or the common optical path of the telescopes. A shutter, of arbitrary design, can be placed in one or both optical channels in order to deactivate one or both of the measurement channels, for reasons that will become apparent below.

In order to increase the sensitivity and improve the signal-to-noise ratio, it is advantageous to use matrix detectors of the charge coupled device (CCD) type and to operate these detectors in the mode known as TDI which compensates for the continuous displacement of the scene observed by each telescope which, in turn, implies that the latter have the same focal length. The optical distortion of the telescopes must therefore be minimized in order to allow the charge transfer frequency to be identical for a part or for the whole of the CCDs.

As was indicated above, the two main applications (but not the only ones) are observations of the Earth from an orbiting satellite and stellar observations. These applications lead to different features of the instrument or of the satellite that carries it.

In the case of Earth observations, the continuous displacement of the scene in the focal plane is caused by the orbital movement or controlled variations in the satellite attitude. Two points on the Earth are observed from two different angles with a time delay by one telescope, then by the other.

In the case where the satellite observes celestial objects or space, the continuous displacement of the scene in the focal plane is caused by variations in the satellite attitude, such as, for example, a rotational movement about an axis fixed in inertial space or slowly varying. Means are to be provided for identifying the objects.

On a satellite equipped with an instrument observing point-like objects simultaneously and continuously through the two telescopes, comprising a real and accessible intermediate focal plane for at least a first of the two telescopes, a device allowing the active telescope to be recognized for each object detected in the common focal plane will generally be provided, such as:

one or more additional matrix detectors disposed in the intermediate focal plane of the first telescope, outside of the overlap region, and systematically detecting all the objects crossing the common field, a field diaphragm disposed in the intermediate focal plane of the first telescope so as to physically define the limits of the common field in this intermediate focal plane, and consequently to define the limits, in the final and common focal plane, of the field effectively seen by the first telescope; one or more additional matrix detectors are then disposed in the final focal plane, but outside of the common region, such that they are not active for the first telescope and that any object detected in the common focal plane through the second telescope necessarily crosses one of these additional detectors; these additional detectors are sufficient for determining the active telescope for any object observed in the common field, since the object will be detected or not by these detectors depending on whether or not it is seen through the second telescope.

Another device will also generally be provided allowing the active telescope to be recognized for each object detected in the common focal plane, without the necessity for an intermediate focal plane. This device assumes the presence of folding mirrors for the two channels oriented so as to produce a differential image rotation between the two channels in the common focal plane. The effect of this differential rotation is to differentiate the trajectories of the objects in the common field with respect to the active telescope.

The above features together with others will be made clearer upon reading the following description of specific embodiments of the invention, presented as non-limiting examples. The description makes reference to the accompanying drawings, in which.

Figure 8:
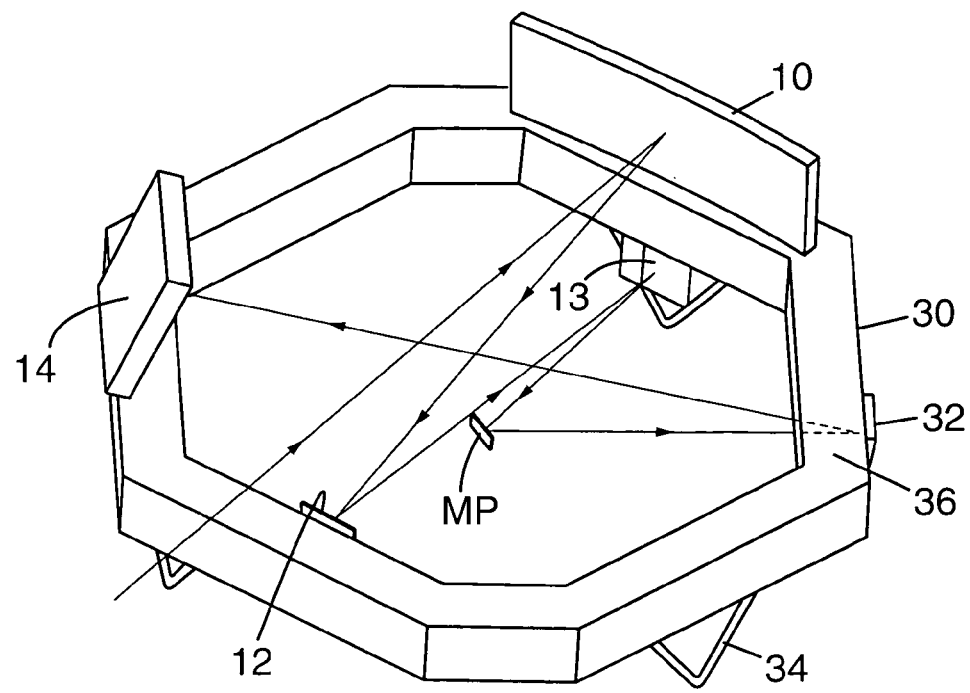
FIG. 8 is a perspective view showing an example of a telescope.
Figure 9:
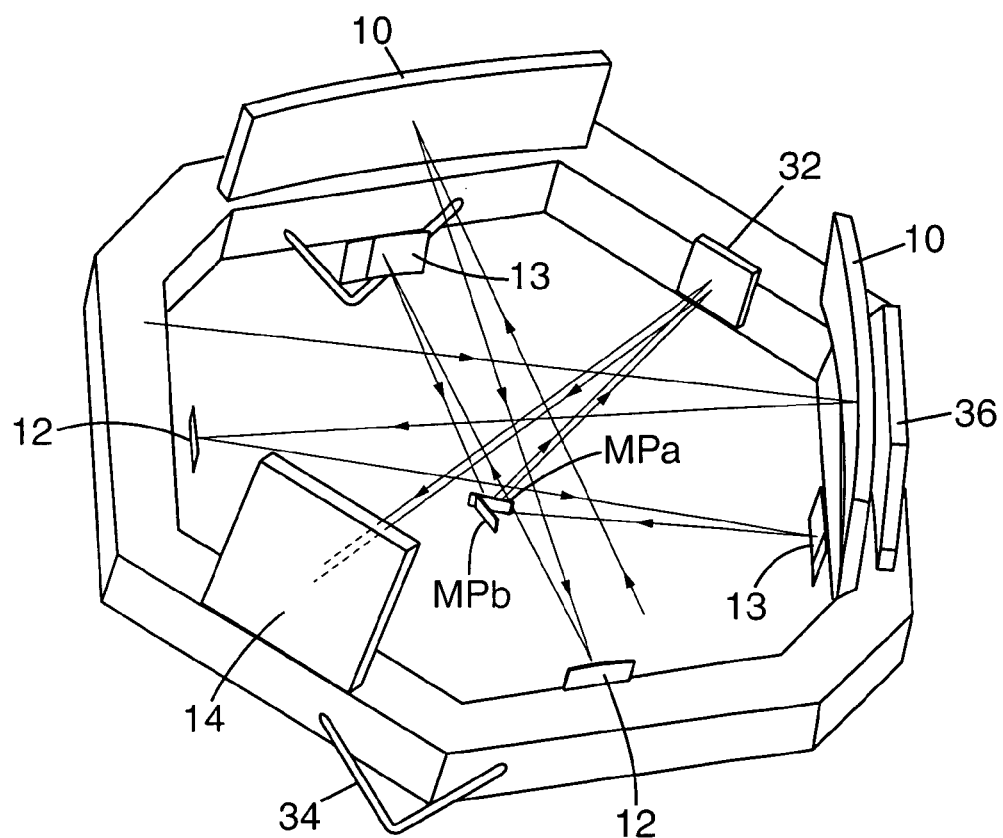

FIG. 9, which is similar to FIG. 8, shows the layout of the optical elements of the two telescopes.

Before describing the complete instrument implementing the invention, it is useful to point out some more general features of the telescopes that can be integrated within it.

A telescope designed for use in space will have a large entry diameter, of at least 1 meter, and a focal length reaching several tens of meters. A large diameter is necessary to reach the required resolutions. Indeed, the angular resolution of a telescope of diameter D is of the order of $\lambda/D$, where $\lambda$ is the wavelength. In order to achieve a resolution of less than 50 cm on the ground from a satellite at an altitude of 700 km, a diameter of at least one meter is required.

Furthermore, the nature of matrix detectors fixes a minimum value for the pixel distribution pitch which is currently of the order of 10 microns. In order to adjust the distribution pitch to the telescope resolution, it will generally be necessary, for a stellar observation telescope, to adopt a focal length in excess of 40 meters for an entry diameter of the order of a meter.

Figure 1:
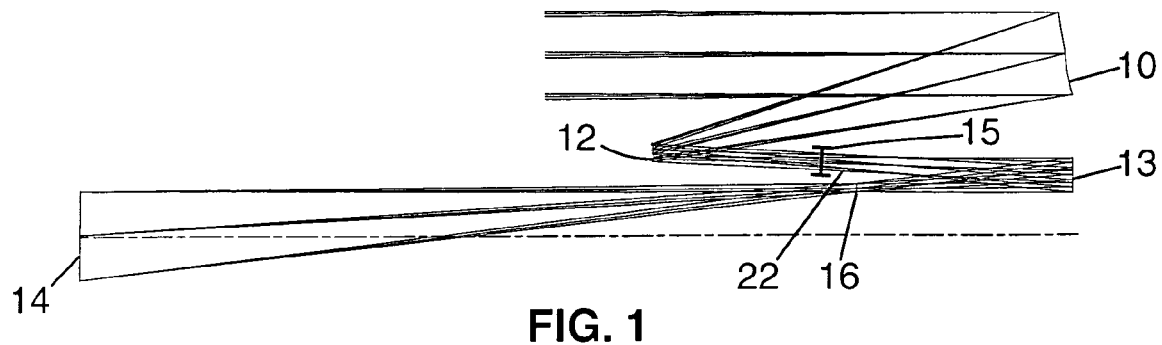
FIG. 1 is a schematic diagram of a telescope that can be used to implement the invention.

Lastly, with such a telescope, the physical dimensions of the focal plane are much larger than those of the currently available detectors, such that it becomes necessary to place several tens, or even several hundreds, of detectors with high-speed video processing systems at the focal plane. For example, a scientific instrument for observing the Earth having a field of 1°×1° with an entry diameter of 1 meter has a focal plane of the order of 850×850 mm and it could, for example, comprise 200 detectors 60×60 mm in size. FIG. 1 shows, by way of an example, the composition of an anastigmatic telescope of long focal length with three off-axis mirrors. It comprises an entry mirror 10, a convex mirror 12 and a concave mirror 13 allowing the size of the telescope to be reduced, and a focal plane 14.

The purpose of FIG. 1 is to demonstrate that the exit pupil 16 is real and of a much smaller size than that of the focal plane, for a telescope with a long focal length. A telescope such as this also has an intermediate image plane 22 which is situated between the mirrors 12 and 13 in the case of FIG. 1.

Figure 2:
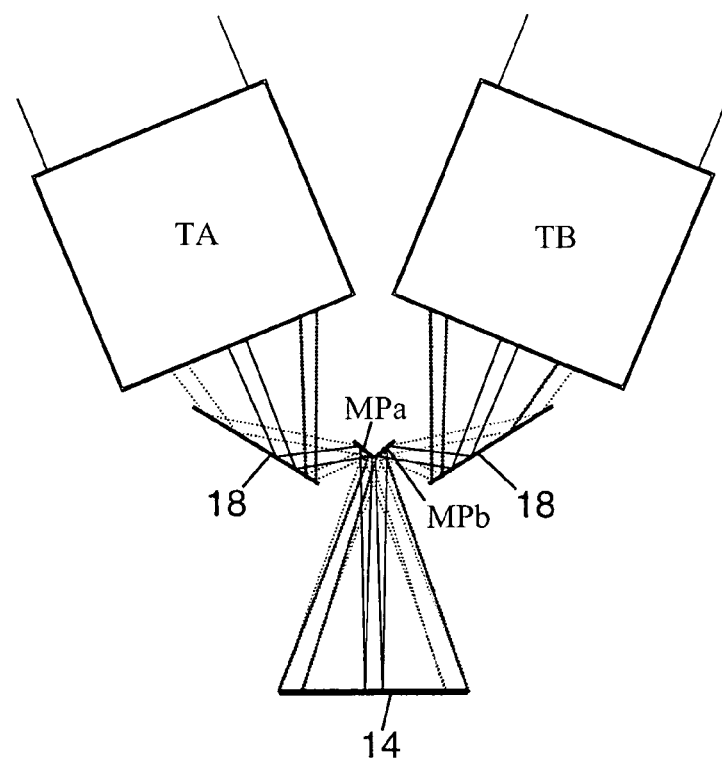
FIG. 2 is an optical schematic diagram of an instrument according to a particular embodiment.

FIG. 2 shows a schematic layout of the components of an instrument implementing the invention. It comprises two telescopes, TA and TB, whose optical axes have the desired angular separation. All the exit beams are narrow and rest on the exit pupil. Consequently, the wavefronts of the two mirrors can be brought into the same plane by placing, for each telescope, a small pupil mirror MPa, MPb in the region of the exit pupil. Plane folding mirrors 18 can be provided if required.

Figure 3:
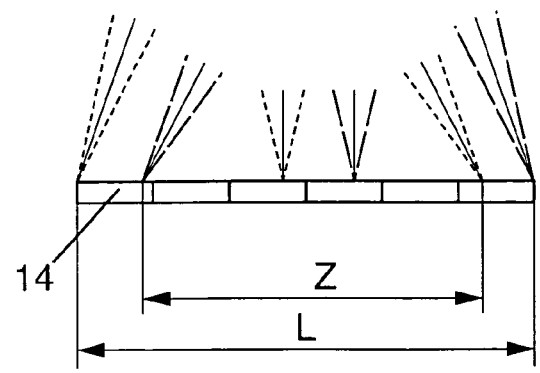
FIG. 3 is a large-scale schematic diagram showing the shift of the image fields.

In this configuration, the superimposition of the two exit optical fields, in other words of the two fields for which the optical combination of each mirror was calculated, is not complete. FIG. 3 shows that, in the common focal plane of the 2 telescopes, the optical field of the telescope TB is shifted from that of the telescope TA by a distance comparable to the diameter of the exit pupil. The overlap region Z (FIG. 3) extends over the major part of the total width L. According to the case in question, detectors will be placed over the whole width L or only over the distance Z, depending on whether the part of the focal plane on which is formed the image delivered by one of the telescopes is used or not.

Figure 4:
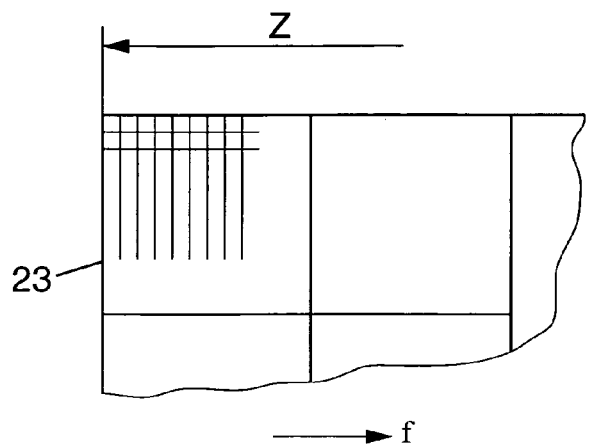
FIG. 4 is a large-scale schematic diagram showing the layout of the sites in a detector.

As was indicated above, the large dimensions of the image field currently lead to the use of a two-dimensional network of matrix detectors, in general formed by CCD detectors 23 such as that of which a section is shown in FIG. 4. These detectors are advantageously used in time delay integration, or TDI, mode allowing the signal/noise ratio to be improved when the scene is continuously displaced linearly in the focal plane, for example in the direction of the arrow f (which is notably the case for instruments sweeping the night sky or observing the Earth in the mode known as "pushbroom"). The charges are transferred, for example, within the detector 23 at a frequency defined by the local speed of displacement of the scene in the direction f. In practice, if the optical distortion is negligible and for sufficiently small field angles θ in the direction f, the relationship between the position x, in the direction f, and the entry angle θ is x=F. θ, where F is the focal length. The number of columns of photosensitive sites over which the integration is performed varies from one application to another. For Earth observation instruments, a few tens of columns will usually be used. Certain scientific applications use several thousands of them. By limiting the distortion, the desynchronization between a charge transfer rate, which is constant, and the speed of displacement of the scene (which causes image blurring) can be sufficiently reduced to maintain a same transfer frequency for all the detectors in the focal plane. In extreme cases, slightly different transfer frequencies are used for different detectors, however a negligible desynchronization on a same detector 23 will always be desirable.

The images delivered by the two telescopes are superimposed on the focal plane and, consequently, it is necessary, in most cases, to provide means allowing the two measurement channels to be differentiated. These means can differ greatly depending on the application of the instrument.

In the case of Earth observations, the two measurement channels cannot operate simultaneously since the object field is very structured. A shutter 15 must be installed for each channel allowing the active channel to be selected. The shutter 15 can be small if it is placed near to the exit pupil 16 or in an intermediate focal plane, such as that indicated at 22 in FIG. 1.

In the case of stellar sensors, where the observed objects are virtually points and are discernible, the two channels can permanently operate simultaneously and the problem is then to discriminate the measurement channels for the observed objects in the common focal plane.

Two methods can notably be used. They are applicable especially when the instrument sweeps the night sky with a regular uniform movement. In order to present a straightforward example the following assumptions will be made:

the satellite is in body rotation about an axis that is fixed in an inertial reference frame or subject to a slow movement compared to the body rotation rate of the satellite, the mean directions of aim (center of the field) of each telescope are perpendicular to the axis of rotation of the satellite, which means that both telescopes sweep a same band of the sky, centered on the great circle perpendicular to the axis of rotation, the field of view, and in a correlated manner the focal plane, are rectangular.

1. A first method uses stellar detectors specific to each channel (FIG. 5)

This method assumes that the telescopes TA and TB have an accessible intermediate focal plane. Since it is geometrically conjugated with the final focal plane, a field diaphragm disposed in the intermediate focal plane allows the limits of the effective field of view of each of the telescopes to be physically defined. Under these conditions, it can be arranged that a column of CCD sites be active for one of the telescopes only and thus determined through which telescope any object crossing the common field is seen.

Figure 5:
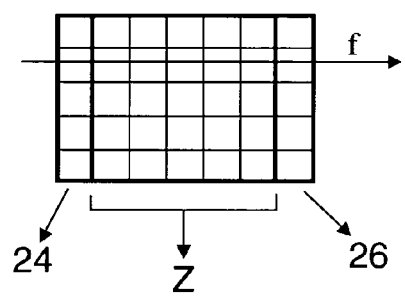
FIG. 5 shows the flow of the charges.

In FIG. 5, which is a view of the final focal plane, the principle implemented is illustrated in the case of a small number of CCD detectors each corresponding to a square. The detector diaphragms of the telescopes TA and TB are such that the first column 24 of sites is only active for the telescope TA, whereas the last column 26 is only active for the telescope TB. The central columns (region Z) are active for both telescopes and form the common focal plane. A star crossing the field and detected by the first column 24 is necessarily seen through the telescope TA. On the contrary, a star detected in the common focal plane but not detected by the first column will necessarily be seen through the telescope TB. The same reasoning can be applied to the last column 26 of CCD detectors. Only one of the two extreme columns is needed to discriminate between the telescopes.

2. A second method performs a discrimination by image rotation (FIGS. 6 and 7)

This method involves folding over the beams such that the images of the sky through the telescopes TA and TB undergo a differential rotation in the plane of the image, the focal planes remaining superimposed. As an example, since the combination of two plane symmetries is a rotation whose axis is defined by the intersection of the two planes, the desired effect can be obtained by suitably orienting the pupil mirrors MP of the telescopes TA and TB and by placing a common mirror between the pupil mirrors and the focal plane. Under these conditions, the images of the stellar trajectories in the focal plane depend on the telescope and it will be possible to determine through which telescope a star crossing the common field has been observed.

Figure 6:
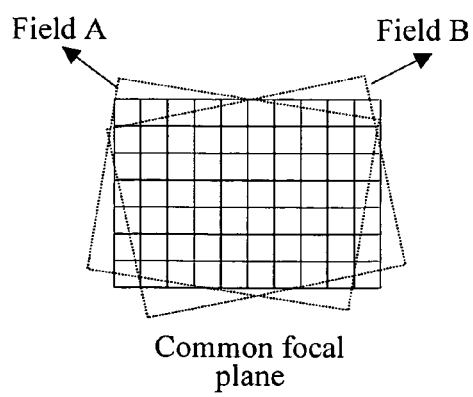
FIGS. 6 and 7 show two modes of determining objects observed by the two telescopes.
Figure 7:
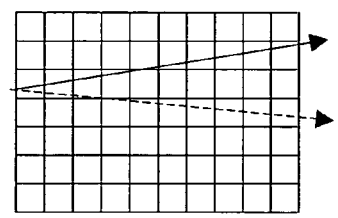

FIG. 6, which is a view in the final focal plane, corresponds to an arrangement such that the folding of the beams generates a small controlled differential rotation of the images produced by each telescope, greatly exaggerated in the figure. As FIG. 7 indicates, the movements of a star in the focal plane will then be different for the two telescopes (as indicated by the continuous and dashed lines) allowing the telescope forming the image to be discerned. In practice, a differential shift of one pixel (or even a fraction of a pixel) after crossing the whole of the common focal plane suffices for discriminating between the telescopes. The degradation of the resolution is negligible, even in TDI mode, since the displacement for a single CCD site will be less than $\frac{1}{20}^{th}$ of a pixel in the direction perpendicular to the direction of travel.

An example of the layout of the various elements, relating to the invention, of an instrument with two telescopes that uses only mirrors will now be presented.

For clarity, only one of the telescopes is shown in FIG. 8. It is mounted onto an annular structure 30 that is sufficiently rigid to be undeformable and is made from a material having a low coefficient of expansion and a high thermal conduction, for example silicon carbide, so as to guarantee the stability and the optical quality of the assembly in the environment of space. Only the principal ray is shown.

The entry mirror 10 of the telescope has its long dimension in the direction of the ring circumference and it is supported by a straight section of the structure 30. The convergent exit beam from the mirror is reflected toward the axis of the surface of which the off-axis mirror 10 forms a part, such that the convex mirror 12 does not cause the beam center to be blocked. The concave mirror 13, supported by the same section of the structure as the mirror 10, delivers a narrow beam at its exit: the pupil mirror Mp is placed substantially on the exit pupil. Instead of orienting the beam directly toward the focal plane 14, it sends it onto another folding mirror 32 that forms the image in the focal plane 14.

Supporting and mounting elements are provided, such as titanium link rods 34 and reinforcing elements, for example angle bracket bracing, for the structure 36. The pupil mirror Mp can be fixed to the structure 30 by a lattice of rods (not shown).

FIG. 9 shows the two-telescope assembly seen from a different angle from that in FIG. 8. The plane folding mirror 32 is common to the beams of the two telescopes. The pupil mirrors MPa and MPb are separated from one another in the direction of their smallest side.

Many alternative embodiments are possible. For example, the general concept can be applied in an intermediate space rather than in the exit pupil. In this case, the final folding mirrors, which are common, do not need to be plane and can have the function of reimaging the common focal plane onto the final focal plane where the CCD detectors would be physically disposed.

The system is now composed of two subsystems that may be considered A and B.

The separation is no longer done in the exit pupil of the whole system (A+B). The subsystem A consists of two telescopes TA and TB with a common focal plane, but the detectors are not placed in the common focal plane of A. B reimages the focal plane of A onto the detectors.

The invention claimed is:

1. An optical instrument designed to be used on a satellite and allowing simultaneous or virtually simultaneous observations to be made in two angularly separated directions, comprising:
   at least two telescopes having angularly separated observation directions, each having one pupil selected from the group consisting of an exit pupil and a real and accessible intermediate pupil, and an image field selected from the group consisting of respective exit image field and intermediate image field, with said image field being of width at least three times larger than that of said pupil in a given direction;
   an optical device placed at said pupil and disposed so as to superimpose the two telescope image fields in a focal plane common to both telescopes, with an overlapping area covering said image field except in lateral regions having a width which is substantially that of said telescope pupil; and
   in said common focal plane, an assembly of at least one matrix detector, disposed and oriented in the superimposed region of said image fields.

2. The instrument as claimed in claim 1, wherein said optical device includes two mirrors, situated in the neighbourhood of said pupils of said two telescopes and oriented in order to superimpose said two image fields.

3. The instrument as claimed in claim 1 or 2, comprising two sets of folding mirrors, respectively following said telescopes in order to bring together said pupils while still keeping them separate.

4. The instrument as claimed in claim 1 or 2 wherein an additional set of folding mirrors is disposed between said pupils and said common focal plane in order to facilitate a mechanical layout of the instrument.

5. The instrument as claimed in claim 1 or 2, wherein optical filters are disposed in at least one optical path of the telescopes.

6. The instrument as claimed in claim 1 or 2, wherein a shutter is placed in at least one optical path in order to deactivate at least one of two measurement channels.

7. The instrument as claimed in claim 1 or 2, wherein said at least one matrix detector is of the charge coupled device (CCD) type and is controlled to operate in time delay integration (TDI) mode which compensates for the continuous displacement of the scene observed by each telescope, both telescopes having the same focal length.

8. The instrument as claimed in claim 1 or 2, wherein said telescopes include mirrors, lenses or a combination of both, each optimized over an extended field, observing in two directions having an adjustable difference and designed such that said pupils can be brought near to one another for superimposing said image fields.

9. The instrument as claimed in claim 1, mounted on a satellite for observing point-like objects simultaneously and continuously through said two telescopes, comprising a real and accessible intermediate focal plane for at least a first of said two telescopes, additionally having a device allowing recognition of the telescope through which an object has been observed for each object detected in said common focal plane.

10. The instrument as claimed in claim 9, wherein said device comprises at least one additional matrix detector disposed in said intermediate focal plane of said first telescope and allowing the detection of all the objects crossing the common focal plane and observed through said first telescope.

11. The instrument as claimed in claim 1 or 2, mounted on a satellite for observing point-like objects simultaneously and continuously through said two telescopes, additionally having a device allowing recognition of the telescope through which an object has been observed for each object detected in said common focal plane.

12. The instrument as claimed in claim 11, wherein said device recognizes the telescope through which the object is observed by analyzing the trajectory of the object image in said common focal plane.

13. The instrument as claimed in claim 9, wherein said device comprises a field stop disposed in an intermediate focal plane of said first telescope so as to define a region in the common focal plane that is no more active for said first telescope, and at least one matrix detector located in said region in the common focal plane.

* * * * *